US011270219B2

(12) United States Patent
Soda et al.

(10) Patent No.: US 11,270,219 B2
(45) Date of Patent: Mar. 8, 2022

(54) DATA COLLECTION DEVICE, DATA COLLECTION SYSTEM, AND DATA COLLECTION METHOD FOR CALCULATING PROBABILITY OF EVENT FOR COLLECTION OF DATA

(71) Applicant: DENSO TEN Limited, Kobe (JP)

(72) Inventors: Tomofumi Soda, Kobe (JP); Yoshitaka Hirashima, Kobe (JP); Tatsuya Hamaoka, Kobe (JP)

(73) Assignee: DENSO TEN Limited, Kobe (JP)

( * ) Notice: Subject to any disclaimer, the term of this patent is extended or adjusted under 35 U.S.C. 154(b) by 313 days.

(21) Appl. No.: 16/535,158

(22) Filed: Aug. 8, 2019

(65) Prior Publication Data

US 2020/0118020 A1 Apr. 16, 2020

(30) Foreign Application Priority Data

Oct. 16, 2018 (JP) ............................ JP2018-195244

(51) Int. Cl.
*G06N 20/00* (2019.01)
*G06N 7/00* (2006.01)
*G08G 1/01* (2006.01)

(52) U.S. Cl.
CPC .......... *G06N 7/005* (2013.01); *G08G 1/0112* (2013.01)

(58) Field of Classification Search
CPC .......... G06N 7/005; G06N 20/00; G06N 3/08; G08G 1/0112
USPC .................. 701/521, 117, 118, 119; 340/436
See application file for complete search history.

(56) References Cited

U.S. PATENT DOCUMENTS 5,748,098 A * 5/1998 Grace .................. H04L 41/142 702/181
8,437,958 B2 * 5/2013 Krause .............. G01C 21/3697 701/533
2013/0345961 A1 * 12/2013 Leader .............. G01C 21/3617 701/410
2015/0243166 A1 * 8/2015 Yoshioka ........... G01C 21/3484 701/117

FOREIGN PATENT DOCUMENTS

JP 2018-055581 A 4/2018

* cited by examiner

*Primary Examiner* — Brent Swarthout
(74) *Attorney, Agent, or Firm* — Oliff PLC

(57) ABSTRACT

A data collection apparatus includes: a collection unit which collects data relating to respective vehicles from vehicular devices installed in the respective vehicles; a reception unit which receives a data collection condition specified by a user; an analysis unit which calculates a probability of occurrence of an event for collection of data specified in the collection condition based on past data collection results; and a providing unit which provides the user with information that is based on the probability of occurrence calculated by the analysis unit.

8 Claims, 15 Drawing Sheets

*FIG. 1B*

| COLLECTION CONDITION PARAMETERS |
|---|
| TARGET VEHICLE |
| DATA TYPE |
| COLLECTION TRIGGER CONDITION |
| COLLECTION PERIOD |
| ⋮ |

COLLECTION CONDITION SETTING PICTURE

| COLLECTION CONDITION #1 | TRIGGER BLOCK #1 ⊕ | | | | |
|---|---|---|---|---|---|
| | | PARAMETER | SYMBOL | THRESHOLD VALUE | |
| | | [▽] [▽] | [▽] | [  ] | |
| | and [▽] | [▽] | [▽] | [  ] | |
| | M1 | | | | |
| COLLECTION DATA #1 | ○ ORDINARY  ○ META INFORMATION | | | | |
| | DATA TYPE | | | | |
| | [▽] | | | | |
| DESIRED NUMBER OF DATA TO BE COLLECTED | [      ] ⟵ M2 | | | | |
| DESIRED DATE AND TIME OF COMPLETION | BY DAY ( ) OF ( ), YEAR ( ), ( ) O'CLOCK ⟵ M3 | | | | |
| SAMPLING CYCLE | [      ] | | | | |
| DIFFERENCE EXTRACTION | ○ YES   ○ NO | | | | |

FIG. 4A

| PARAMETER | SYMBOL | THRESHOLD VALUE |
|---|---|---|
| VEHICLE SPEED | > | 60km/h |

FIG. 4B

PRIORITY RANK C

| ITEM | SPECIFIED VALUE | DEGREE OF RELATION |
|---|---|---|
| PARAMETER | VEHICLE SPEED | - |
| | ACCELERATION | A |
| | BRAKE PRESSURE | C |
| | ENGINE ROTATION SPEED | B |
| | ENGINE OIL TEMPERATURE | F |

PRIORITY RANK A

| ITEM | SPECIFIED VALUE | DEGREE OF RELATION |
|---|---|---|
| SYMBOL | > | – |
| | ≥ | △ |
| | = | × |
| | < | × |
| | ≤ | × |

PRIORITY RANK B

| ITEM | SPECIFIED VALUE | DEGREE OF RELATION |
|---|---|---|
| THRESHOLD VALUE | 60 | – |
| | 50 | △ |
| | 40 | × |
| | 70 | △ |
| | 80 | × |

DATA COLLECTION DEVICE, DATA COLLECTION SYSTEM, AND DATA COLLECTION METHOD FOR CALCULATING PROBABILITY OF EVENT FOR COLLECTION OF DATA

CROSS-REFERENCE TO RELATED APPLICATIONS

This application is based on and claims priority under 35 USC 119 from Japanese Patent Application No. 2018-195244 filed on Oct. 16, 2018.

TECHNICAL FIELD

An embodiment of the present disclosure relates to a data collection apparatus, a data collection system, and a data collection method.

BACKGROUND ART

Data collection apparatus are known that collect road information from vehicular devices installed in respective vehicles. These data collection apparatus collect road information at desired positions by selecting vehicles as road information collection targets on the basis of pieces of position information of the respective vehicles (refer to JP-A-2018-055581, for example).

SUMMARY OF INVENTION

However, the above-described conventional technique has room for improvement in allowing a user to recognize the certainty of information collection under a specified collection condition.

More specifically, in the above-described conventional technique, a user can connect a terminal to a center apparatus and specify a desired collection condition such as an upload condition through a user interface on the center apparatus. This contributes to, among other things, flexible information collection that is suitable for a situation and reduction of the amount of communication. However, on the other hand, it has problems that the user has difficulty recognizing at what probability information is collected under a specified collection condition and recognizing, on the basis of that probability, what number of pieces of information can be collected in a desired collection period.

One aspect of an embodiment has been made in view of the above, and hence its object is to provide a data collection apparatus, a data collection system, and a data collection method that allows a user to recognize the certainty of information collection under a specified collection condition.

A data collection apparatus according to the one aspect of the embodiment is equipped with a collection unit, a reception unit, an analysis unit, and a providing unit. The collection unit collects data relating to respective vehicles from vehicular devices installed in the respective vehicles. The reception unit receives a data collection condition specified by the user. The analysis unit calculates a probability of occurrence of an event for collection of data specified in the collection condition on the basis of past data collection results. The providing unit provides the user with information that is based on the probability of occurrence calculated by the analysis unit.

The one aspect of an embodiment allows a user to recognize the certainty of information collection under a specified collection condition.

BRIEF DESCRIPTION OF DRAWINGS

FIG. 1B is a second drawing for outlining the data collection method according to the embodiment.

FIG. 4A is a first drawing for description of a similar condition search operation.

FIG. 4B is a second drawing for description of the similar condition search operation.

DETAILED DESCRIPTION OF THE INVENTION

A data collection apparatus, a data collection system, and a data collection method according to an embodiment of the present disclosure will be hereinafter described in detail with reference to the accompanying drawings. The present invention is not limited to the embodiment described below.

In the following description, the term "frequency" means a rate that is extracted statistically from past results or at which a certain event occurred. And the term "probability" means a rate at which a certain event will occur in the future.

First, the data collection method according to the embodiment will be outlined with reference to FIGS. 1A-1H. FIGS. 1A-1H are first to eighth drawings for outlining the data collection method according to the embodiment. The data collection method according to the embodiment will be described below with reference to FIGS. 1A-1H using an example data collection system 1 to which it is applied.

Figure 1A:
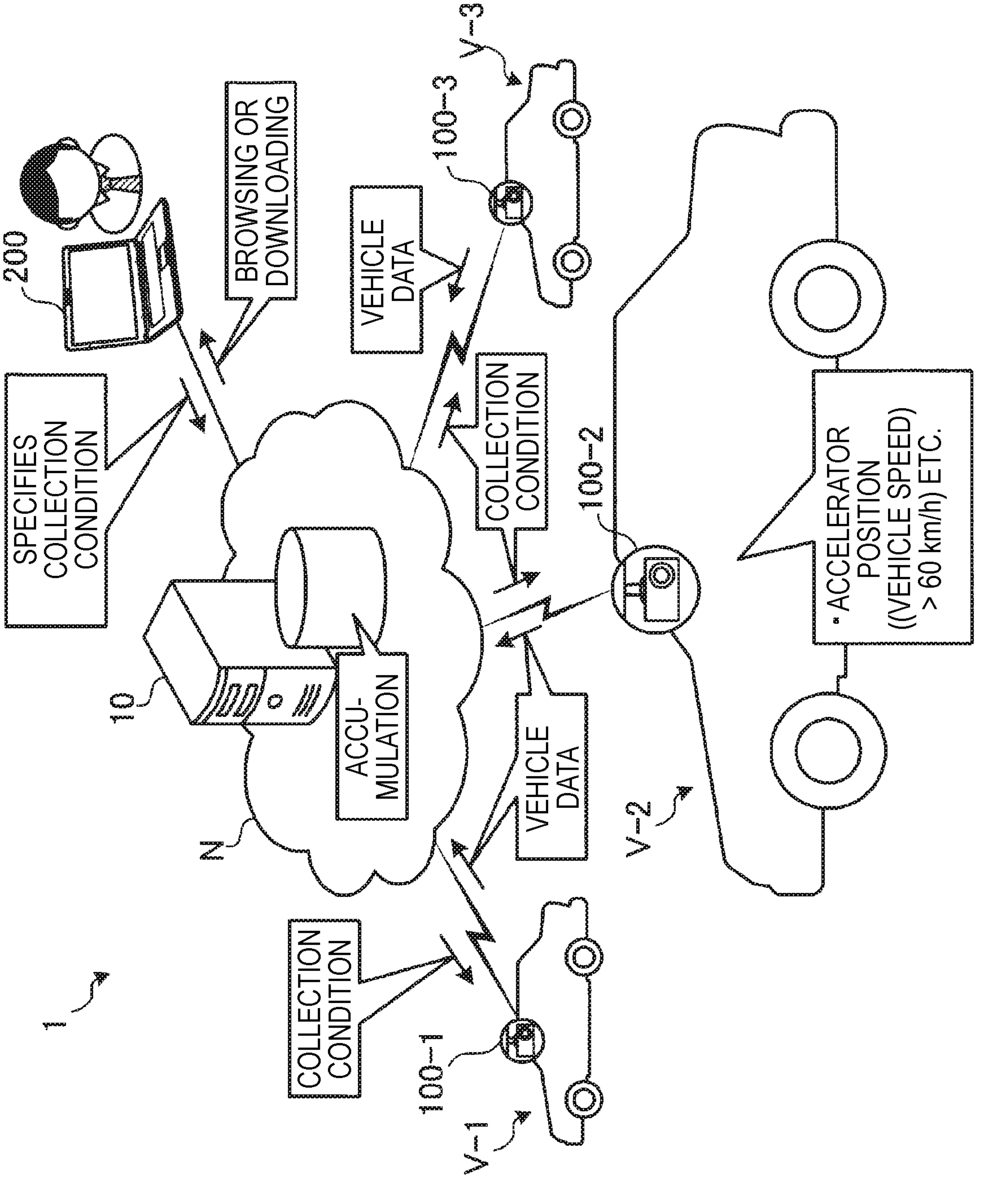
FIG. 1A is a first drawing for outlining a data collection method according to an embodiment.

As shown in FIG. 1A, the data collection system 1 according to the embodiment includes a data collection apparatus 10, vehicular devices 100-1, 100-2, 100-3, . . . that are installed in respective vehicles V-1, V-2, V-3, . . . , and a user terminal 200.

The data collection apparatus 10, which is implemented as, for example, a cloud server that provides a cloud service over a network N such as the Internet or a cellphone network, receives a vehicle data collection request from a data user, collects vehicle data from the respective vehicular devices 100 on the basis of the received collection request, and provides collected vehicle data to the data user.

Each vehicular device 100, which is, for example, a drive recorder having a camera, various sensors such as an acceleration sensor and a GPS (global positioning system) sensor, a storage device, a microcomputer, etc., picks up vehicle data that comply with a collection request received by the data collection apparatus 10.

Each vehicular device 100 uploads picked-up vehicle data to the data collection apparatus 10 as necessary. Using a drive recorder also as vehicular device 100 in this manner enables effective use of vehicular components installed in each vehicle V. Alternatively, a vehicular device 100 and a driver recorder may be used as separate devices.

The user terminal 200, which is a terminal that is used by the data user, is, for example, a notebook PC (personal computer), a desk-top PC, a tablet terminal, a PDA (personal digital assistant), a smartphone, or a wearable device such as glasses-type or wrist-watch-type information processing terminal.

For example, the data user is a developer who develops an autonomous drive technique on the basis of vehicle data provided by the data collection apparatus 10. The data collection apparatus 10 provides such a data user with user interface (hereinafter abbreviated as "UI") pictures on the user terminal 200.

As shown in FIG. 1A, the data user specifies a vehicle data collection condition via such a UI picture. In response, the data collection apparatus 10 distributes the specified collection condition to each vehicle V in a file form, for example.

As shown in FIG. 1B, the collection condition includes various parameters relating to collection of vehicle data. As shown in FIG. 1B, the various parameters are, for example, "target vehicle," "data type," "collection trigger condition," "collection period," etc. The data user can specify them in a desired manner through the above-mentioned UI picture.

"Target vehicle" is identification information of a vehicle V as a collection target. "Data type" is a type of collection target data such as an acceleration position. "Collection trigger condition" is a condition as a trigger of collection and is, for example, a condition that the vehicle speed has exceeded a prescribed speed.

For example, in the example of FIG. 1A, for the vehicular device 100-2 of at least the vehicle V-2, a collection condition is specified to collect data of the data type "accelerator position" using the collection trigger condition "(vehicle speed)>60 km/h."

Each vehicular device 100 uploads vehicle data picked up in the vehicle V to the data collection apparatus 10 with proper timing, and the data collection apparatus 10 stores the received vehicle data. The data user browses or downloads vehicle data accumulated in the data collection apparatus 10, for example, via a UI picture mentioned above.

Figure 1C:
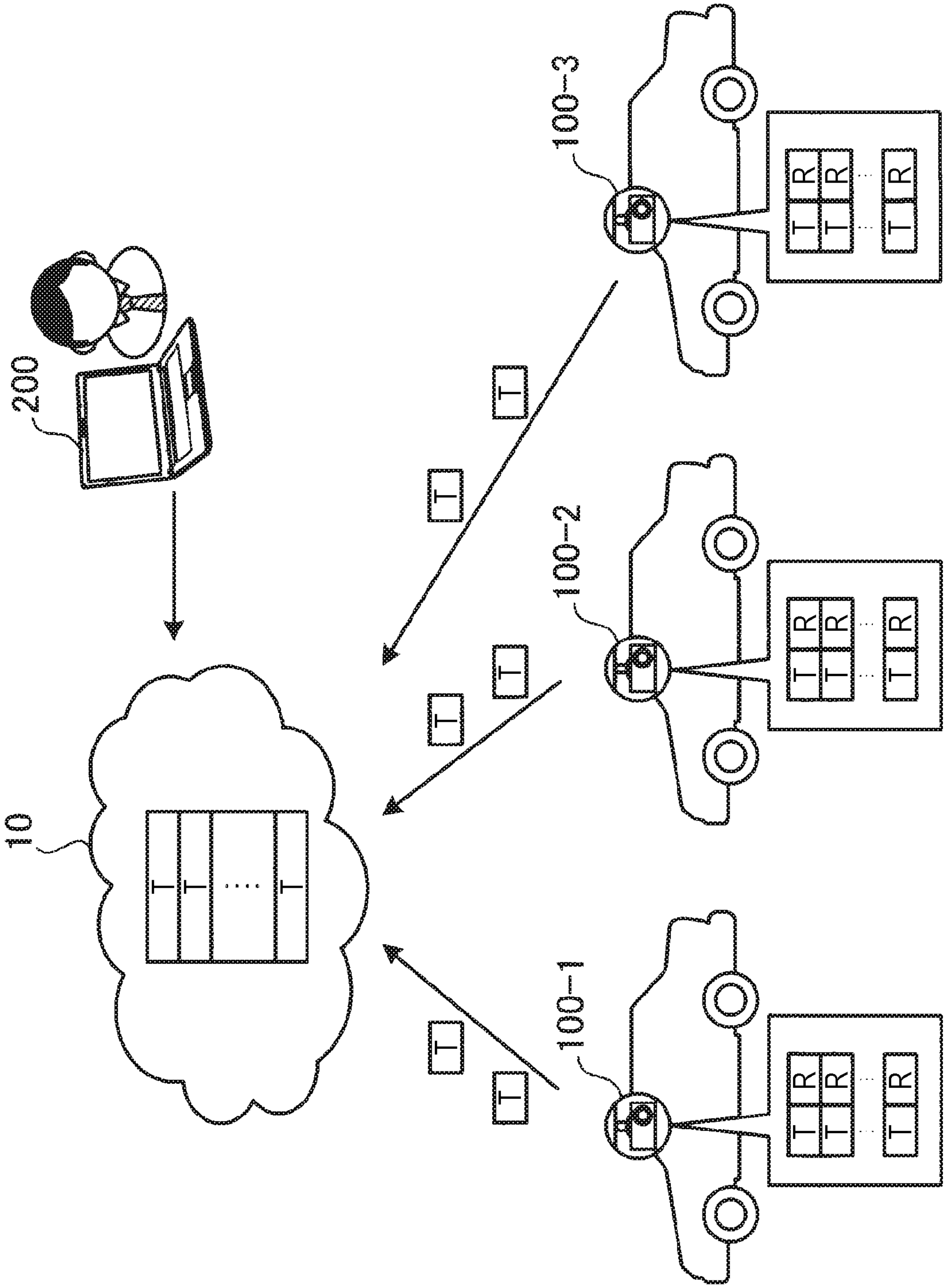
FIG. 1C is a third drawing for outlining the data collection method according to the embodiment.
Figure 1D:
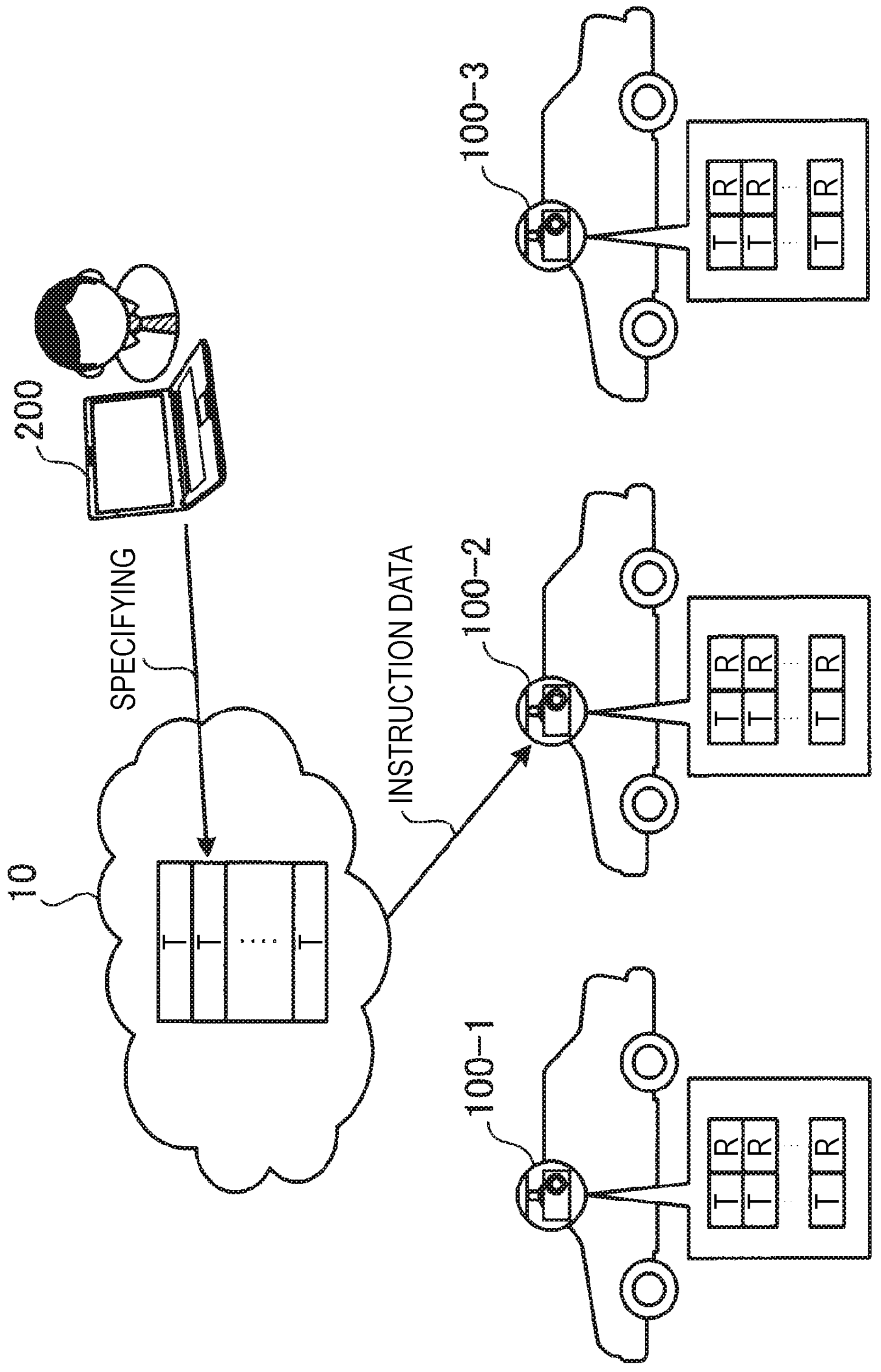
FIG. 1D is a fourth drawing for outlining the data collection method according to the embodiment.

To describe the data collection method more specifically, a series of steps according to which vehicle data is provided to the data user in the data collection system 1 will be described with reference to FIGS. 1C-1E. First, as shown in FIG. 1C, the data user specifies a collection condition using the user terminal 200 which is connected to the data collection apparatus 10.

In this operation, the data collection apparatus 10 generates data for generation of tag data T having characteristics of index data to be attached to real data R to be collected and to be used for searching for or recognizing its outline. Data for generation of such tag data T is generated by manipulations by the data user using a program and data stored in the user terminal 200 or the data collection apparatus 10.

The specified collection condition and the generated data for generation of tag data T are stored in the data collection apparatus 10 and delivered to vehicles V as data collection targets and stored in their vehicular devices 100.

Each vehicular device 100 monitors output data of various sensors. If an event that satisfies the stored collection condition has occurred, the vehicular device 100 stores its real data R in a storage device. Furthermore, each vehicular device 100 generates tag data T corresponding to the real data R on the basis of the stored data for generation of tag data T and the real data, and stores the generated tag data T. Each vehicular device 100 uploads the generated tag data T to the data collection apparatus 10 and the data collection apparatus 10 stores the received tag data T. At this time, the real data R is not uploaded to the data collection apparatus 10.

When the data user connects the user terminal 200 to the data collection apparatus 10 to check a data collection status or collect real data R, meta information that is based on tag data T collected by the data collection apparatus 10 is displayed on the user terminal 200. At the same time, UI picture for allowing manipulations for collecting real data R corresponding to each piece of tag data T When as shown in FIG. 1D the data user specifies tag data T corresponding to real data R to be collected through the user terminal 200, instruction data that specifies the real data R is transmitted from the data collection apparatus 10 to the vehicular device 100 concerned.

Figure 1E:
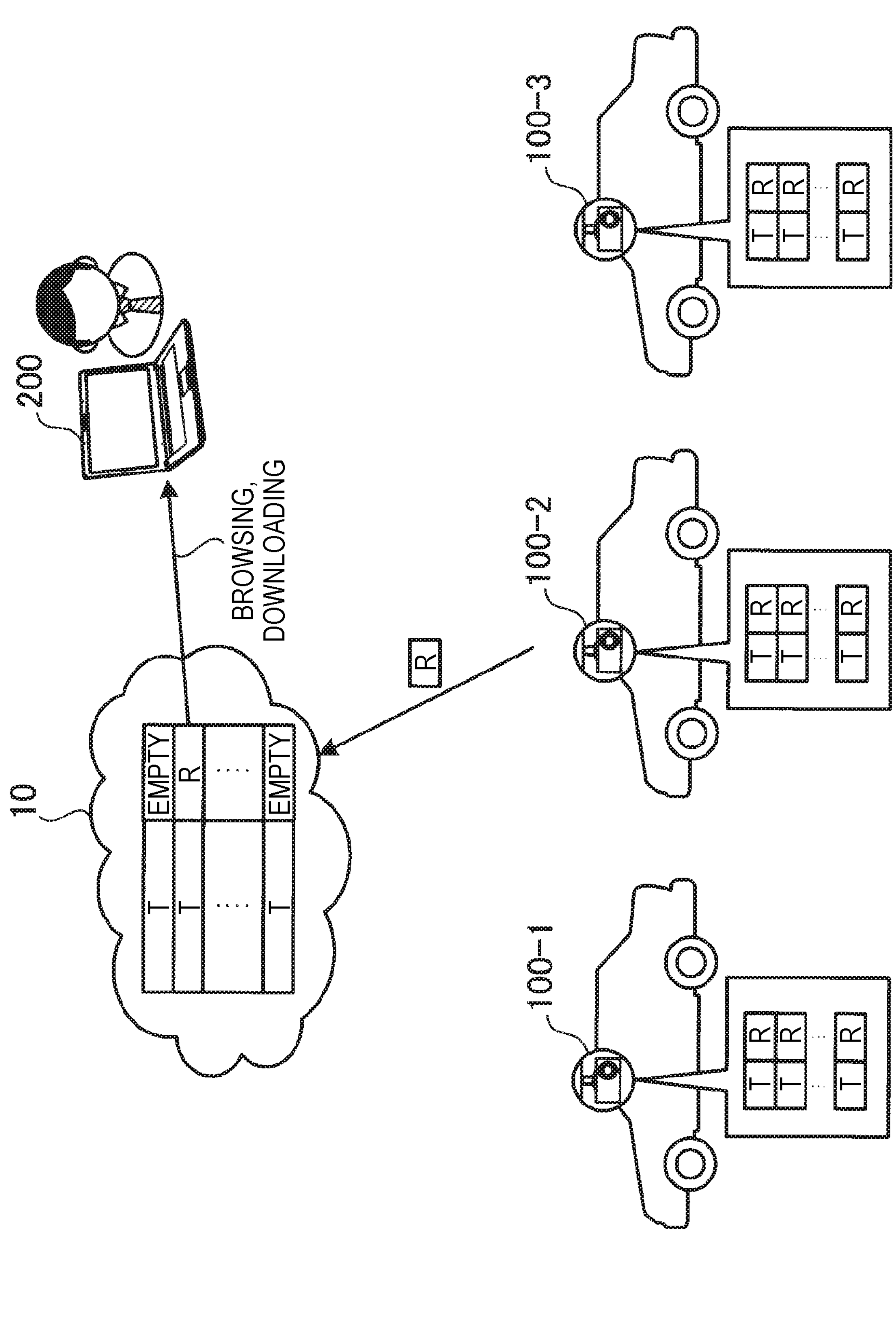
FIG. 1E is a fifth drawing for outlining the data collection method according to the embodiment.

Then, as shown in FIG. 1E, the specified real data R is uploaded from each vehicular device 100 to the data collection apparatus 10 and stored therein. From the user terminal 200, the data user browses or downloads, for example, the real data R stored in the data collection apparatus 10 by accessing them.

From the viewpoint of the data capacity of each vehicular device 100, it is preferable that real data R and corresponding tag data R that have been uploaded to the data collection apparatus 10 be deleted from the vehicular device 100 after their uploading to the data collection apparatus 10.

It is preferable that tag data T not be data obtained by simply extracting part of real data R but be data that is converted into meta information to such an extent as to allow the data user to recognize an outline of the real data R and to judge whether the real data R is necessary when referring to the tag data T.

Incidentally, as described above, the data user can specify collection condition parameters in a desired manner. However, this means that it is difficult for the data user to recognize at what probability information is collected certainly under a specified collection condition and to recognize, on the basis of that probability, what number of pieces of information can be collected in a desired collection period.

Figure 1F:
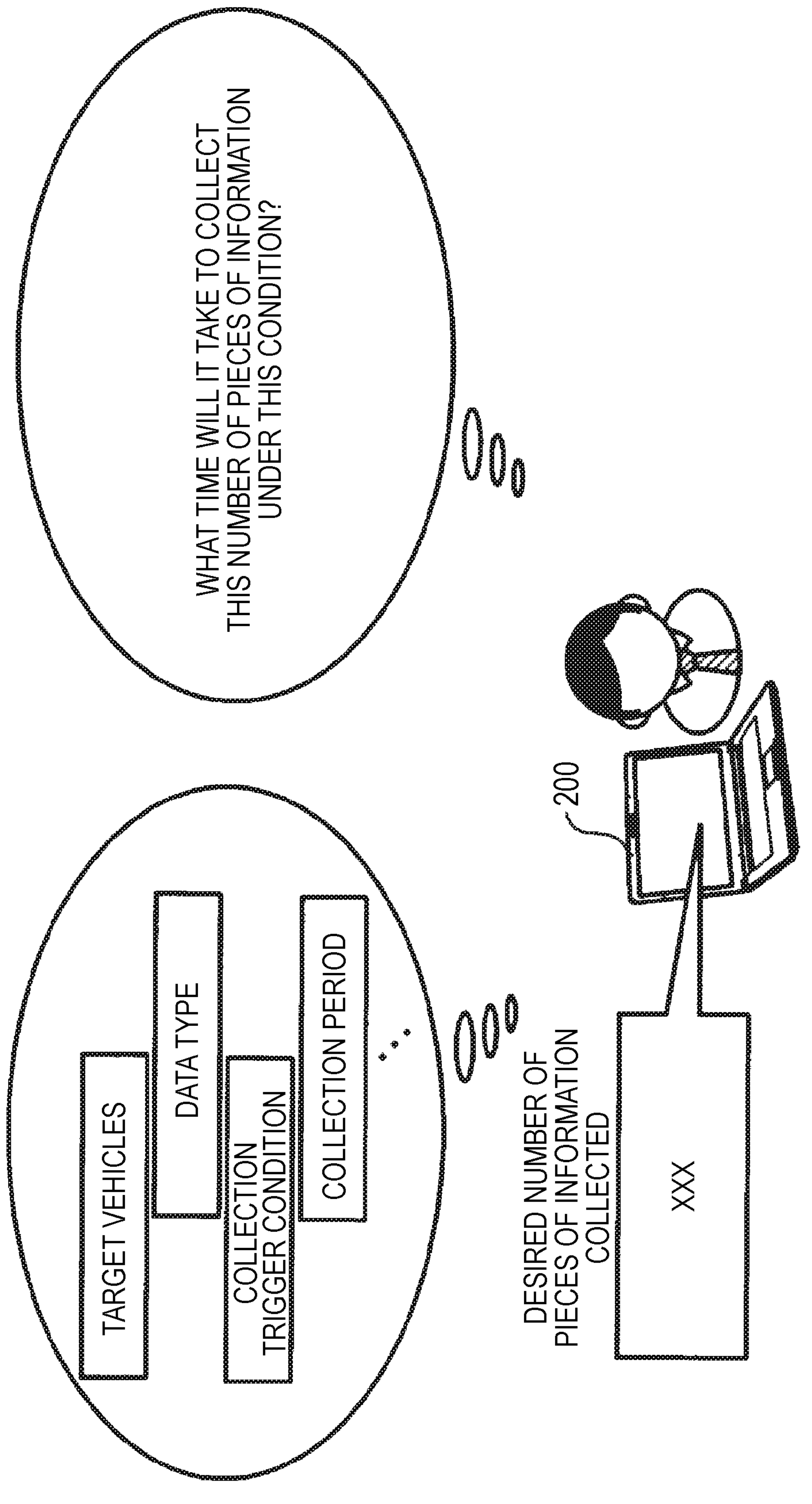
FIG. 1F is a sixth drawing for outlining the data collection method according to the embodiment.

That is, as shown in FIG. 1F, that it is difficult for the data user to recognize what time it will take to collect a desired number XXX of pieces of information collected under a collection condition specified in a desired manner.

In view of the above, in the data collection method according to the embodiment, when receiving a desired (specified) collection condition and a desired (specified) number of pieces of collected information from the data user, the data collection apparatus 10 extracts a frequency of occurrence of an event as a trigger of data collection on the basis of past similar collection conditions (hereinafter referred to as "similar conditions"). Furthermore, the data collection apparatus 10 calculates a probability of occurrence of the event under the collection condition specified by the data user on the basis of the extracted frequency, generates probability information relating to the calculated probability, and informs the user terminal 200 of the generated probability information.

Figure 1G:
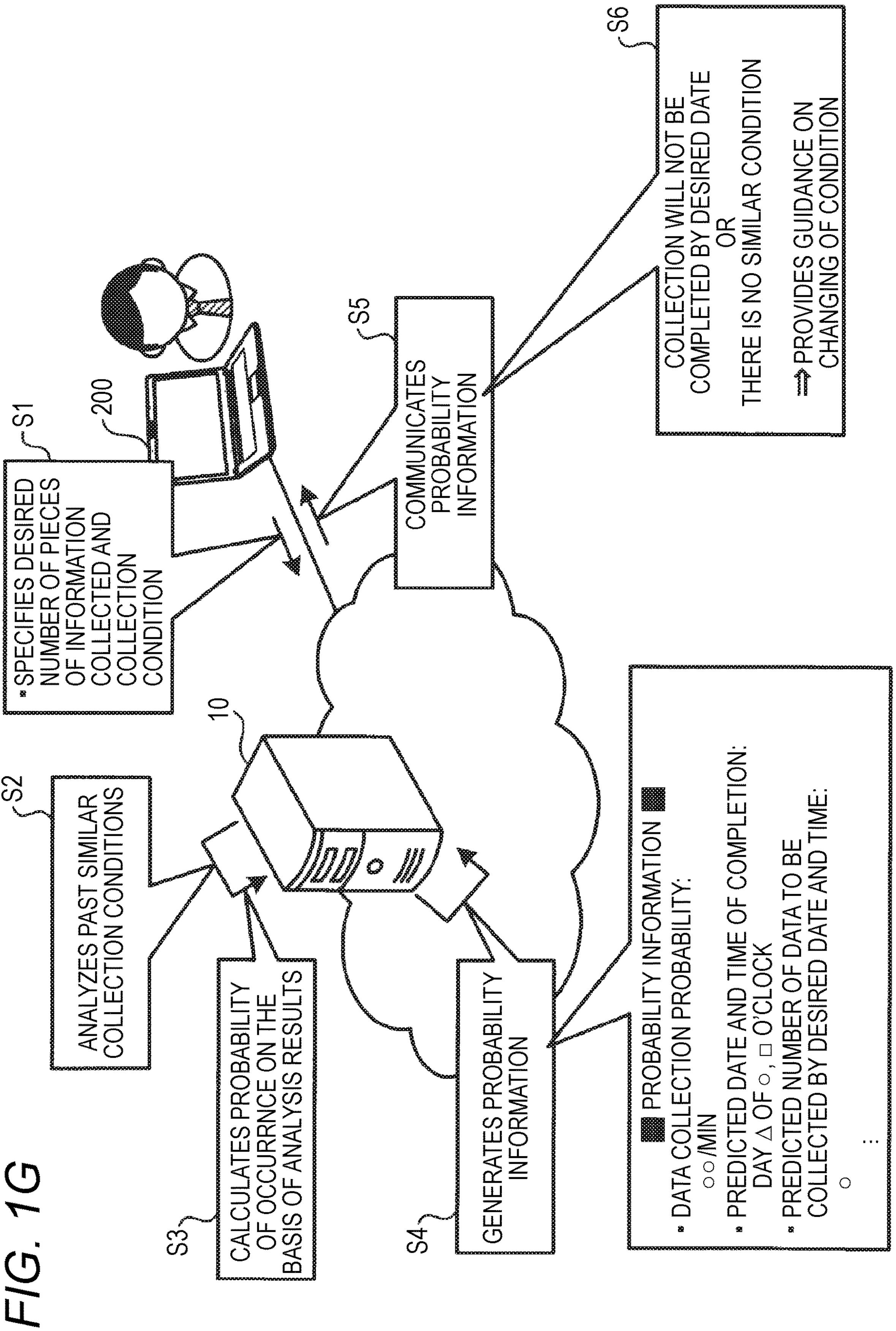
FIG. 1G is a seventh drawing for outlining the data collection method according to the embodiment.

More specifically, as shown in FIG. 1G, in the data collection method according to the embodiment, first, at step S1, the data user specifies a desired number of pieces of information collected and a collection condition through the user terminal 200. In response, the data collection apparatus 10 analyzes past similar conditions at step S2 and calculates a probability of occurrence (mentioned above) on the basis of analysis results at step S3.

At step S4, the data collection apparatus 10 generates probability information relating to the calculated probability. As shown in FIG. 1G, the probability information includes, for example, "data collection probability: ○○/min," "predicted date and time of completion: day Δ of ○, □ o'clock," and "predicted number of data to be collected by desired date and time: ○."

At step S5, the data collection apparatus 10 informs the user terminal 200 of the generated probability information. If the collection will not be finished by a desired date specified by the data user or there is no similar condition, at step S6 the data collection apparatus 10 provides the data user with guidance on changing of the condition.

Figure 1H:
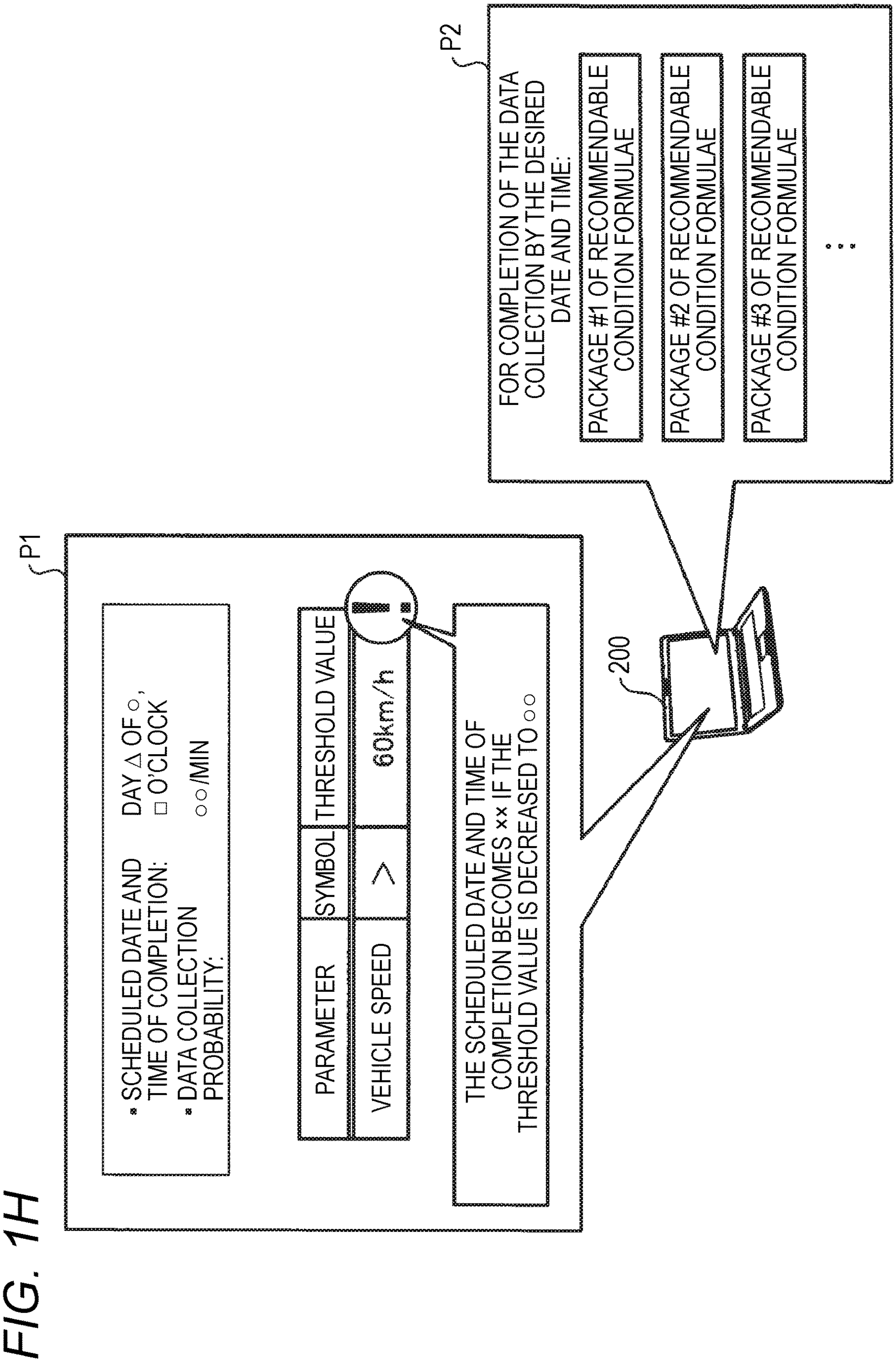
FIG. 1H is an eighth drawing for outlining the data collection method according to the embodiment.

More specifically, as shown in FIG. 1H, the data collection apparatus 10 provides the user terminal 200 with a UI picture for guidance on changing of the condition. For example, the data collection apparatus 10 causes the user terminal 200 to display "scheduled date and time of completion" as part of a pattern P1 shown in FIG. 1H. "Data collection probability" may also be displayed. As shown in FIG. 1H, "data collection probability" is not limited to the number of data occurring per a prescribed time" like "○○/min" and may be an interval between occurrences such as "ΔΔ min/(piece of data)."

As shown in the pattern P1 in FIG. 1H, the data collection apparatus 10 urges the data user to input a condition having a proper value by causing display of a guidance message such as "The scheduled date and time of completion becomes xx if the threshold value is decreased to ○○."

The data collection apparatus 10 may search, in advance, past results etc. for similar conditions under which the collection will be completed by the desired date and time specified by the data user and display packages of recommendable condition formulae in the form of a list as a pattern P2. If the data user selects a desired package from the list, the collection condition can be changed easily so as to reflect the contents of the selected package.

As described above, in the data collection method according to the embodiment, when receiving, from the data user, a desired collection condition and a desired number of data to be collected specified by the data user, the data collection apparatus 10 extracts a frequency of occurrence of events to become triggers for data collection on the basis of past similar conditions. Furthermore, the data collection apparatus 10 calculates a probability of occurrence of such events under the collection condition specified by the data user, generates probability information relating to the calculated probability, and informs the user terminal 200 of it.

As a result, the data collection method according to the embodiment allows the data user to recognize the certainty of information collection under the specified collection condition. The configuration of the data collection system 1 according to the embodiment will be hereinafter described in more detail.

Figure 2:
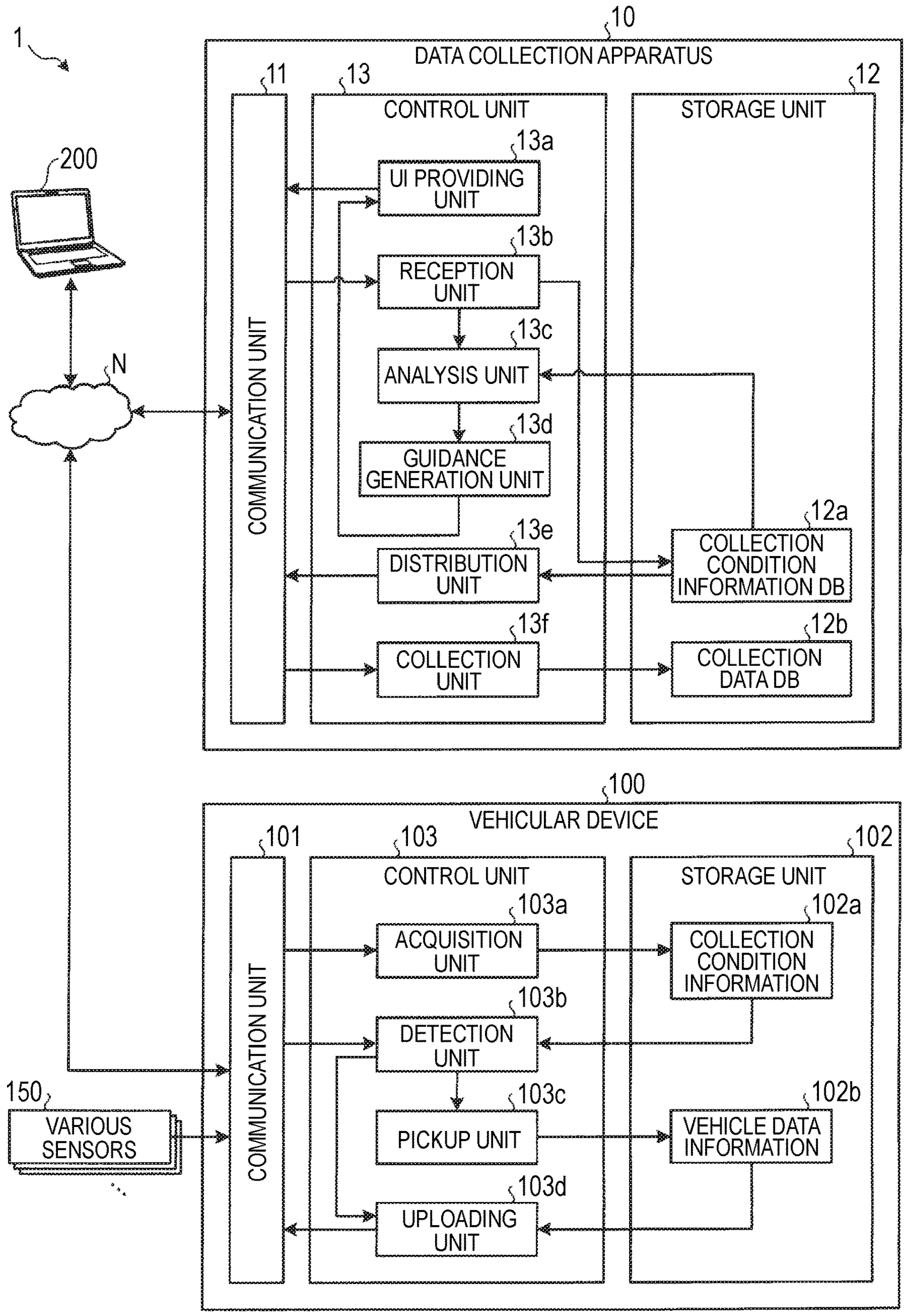
FIG. 2 is a block diagram showing an example configuration of a data collection system according to the embodiment.

FIG. 2 is a block diagram showing an example configuration of the data collection system 1 according to the embodiment. FIG. 2 shows only constituent elements that are necessary for description of features of the embodiment and do not show common constituent elements.

In other words, the constituent elements shown in FIG. 2 are functional and conceptual ones and need not always be the ones shown in FIG. 2 in a physical sense. For example, a specific manner of distribution/integration of the respective blocks is not limited to the one shown in FIG. 2 and all or part of them may be distributed or integrated functionally or physically in desired units according to various kinds of loads, a use situation, and other factors.

In the following description that will be made with reference to FIG. 2, constituent elements that have already been described may not be described at all or may be described only briefly.

As shown in FIG. 2, the data collection system 1 according to the embodiment includes the data collection apparatus 10, the vehicular devices 100, and the user terminal 200.

The data collection apparatus 10 will be described first, which is equipped with a communication unit 11, a storage unit 12, and a control unit 13.

For example, the communication unit 11 is implemented as an NIC (network interface card). Connected to a network N by wire or wirelessly, the communication unit 11 exchanges information with the vehicular devices 100 and the user terminal 200 over the network N.

The storage unit 12 is implemented as a semiconductor memory device such as RAM (random access memory) or a flash memory or a storage device such as a hard disk drive or an optical disc. In the example of FIG. 2, the storage unit 12 stores a collection condition information DB 12*a* and a collection data DB 12*b*.

Collection conditions that have been specified by the user terminal 200 and received by a reception unit 13*b* (described later) are accumulated in the collection condition information DB 12*a*. That is, the collection condition information DB 12*a* contains past results of collection conditions.

Collection data that have been collected from the vehicular devices 100 by a collection unit 13*f* (described later) are accumulated in the collection data DB 12*b*. That is, the collection data DB 12*b* contains tag data T and real data R (described above).

The control unit 13 is a controller and is implemented in such a manner that a CPU (central processing unit), an MPU (microprocessing unit), or the like runs various programs stored in an internal storage device of the data collection apparatus 10 using a RAM as a working area. The control unit 13 can be implemented by an integrated circuit such as an ASIC (application-specific integrated circuit) or an FPGA (field programmable gate array).

The control unit 13 is equipped with a UI providing unit 13*a*, the reception unit 13*b*, an analysis unit 13*c*, a guidance generation unit 13*d*, a distribution unit 13*e*, and the collection unit 13*f* and performs or realizes information processing functions and workings described later.

The UI providing unit 13*a* generates a collection condition setting picture and various UI pictures relating to data collection and provides them to the user terminal 200 via the communication unit 11. Specific examples of the UI pictures will be described later with reference to FIGS. 3A and 3B. Furthermore, the UI providing unit 13*a* provides guidance information generated by the guidance generation unit 13*d* (described later) in such a manner that it is included in a UI picture.

The guidance information contains probability information relating to a probability calculated by the analysis unit 13*c* (described later) on the basis of a collection condition specified by the data user through the user terminal 200.

The reception unit 13*b* receives, via the communication unit 11, a desired number of data and a collection condition specified by the data user through the user terminal 200 and informs the analysis unit 13*c* of them. Furthermore, the reception unit 13*b* stores the collection condition specified by the data user in the collection condition information DB 12*a*.

When receiving, for example, a collection condition that has been changed by the data user so that the data collection will be completed by a desired date and time, the reception unit 13*b* updates a corresponding collection condition in the collection condition information DB 12*a*.

The analysis unit 13*c* analyzes past similar conditions on the basis of the desired number of data to be collected and the collection condition received by the reception unit 13*b*, the collection condition information DB 12*a*, and the collection data DB 12*b*. More specifically, the analysis unit 13*c* extracts past similar conditions that are similar to the collection condition received by the reception unit 13*b* from the collection condition information DB 12*a*. The term "similar conditions" include the same condition.

In doing so, the analysis unit 13*c* retrieves past similar conditions in descending order of similarity from the collection condition information DB 12*a* on the basis of priority ranks that are correlated with respective items of the collection condition. This will be described later with reference to FIGS. 4A-4C.

If a similar condition has been extracted, the analysis unit 13*c* extracts a frequency of occurrence of a trigger event of data collection under this similar condition on the basis of the collection data DB 12*b*. Then the analysis unit 13*c* calculates a probability of occurrence of the above event under the collection condition specified by the data user on the basis of the extracted frequency. The analysis unit 13*c* informs the guidance generation unit 13*d* of the calculated probability.

If no similar condition has been extracted, the analysis unit 13*c* informs the guidance generation unit 13*d* of an item of the collection condition that enables extraction of a similar condition(s) with a lower degree of alteration.

If a similar condition has been extracted but with the calculated probability the data collection will not be completed by the desired date and time, the analysis unit 13*c* searches for conditions under which the data collection will be completed by the desired date and time with lower degrees of alteration and informs the guidance generation unit 13*d* of a search result. In other words, if a scheduled date and time of completion of data collection under the similar condition is later than the desired date and time, the analysis unit 13*c* extracts other similar conditions under which data collection will be completed by the desired date and time in descending order of the degree of alteration and causes the UI providing unit 13*a* to inform the data user of them. The analysis unit 13*c* may list up plural such similar conditions and inform the data user of them in a form like the packages of recommendable condition formulae shown in FIG. 1H.

The guidance generation unit 13*d* generates guidance information relating to a collection condition on the basis of the analysis result communicated from the analysis unit 13*c* and informs the UI providing unit 13*a* of it (the guidance generation unit 13*d* does so also in a case of causing the data user to change the collection condition). For example, the guidance generation unit 13*d* generates guidance information so that probability information as shown in FIG. 1G is displayed. Furthermore, for example, the guidance generation unit 13*d* generates guidance information so that guidance on changing of the collection condition as shown in FIG. 1H is displayed.

The distribution unit 13*e* distributes a set collection condition stored in the collection condition information DB 12*a* to target vehicles V in, for example, a file form via the communication unit 11. The collection unit 13*f* collects, via the communication unit 11, vehicle data that are uploaded from the vehicular devices 100 and accumulates them in the collection data DB 12*b*.

Next, each vehicular device 100 will be described, which is equipped with a communication unit 101, a storage unit 102, and a control unit 103. As described above, various sensors 150 such as a camera, an acceleration sensor, and a GPS sensor are connected to the vehicular device 100.

Like the communication unit 11, the communication unit 101 is implemented as an NIC, for example. The communication unit 101 is connected to the network N wirelessly, and exchanges information with the data collection apparatus 10 over the network N. Furthermore, the communication unit 101 receives output data of the various sensors 150.

Like the storage unit 12, the storage unit 102 is implemented as a semiconductor memory device such as RAM or a flash memory or a storage device such as a hard disk drive or an optical disc. In the example of FIG. 2, the storage unit 102 stores collection condition information 102*a* and vehicle data information 102*b*.

The collection condition information 102*a* is information including a collection condition delivered from the data collection apparatus 10. The vehicle data information 102*b* information including vehicle data picked up by a pickup unit 103*c* (described later). Each piece of vehicle data includes tag data T and real data R (described above).

Like the controller 13, the control unit 103 is a controller and is implemented in such a manner that a CPU, an MPU, or the like runs various programs stored in an internal storage device of the vehicular device 100 using a RAM as a working area. The control unit 103 can be implemented by an integrated circuit such as an ASIC or an FPGA.

Equipped with an acquisition unit 103*a*, a detection unit 103*b*, the pickup unit 103*c*, and an upload unit 103*d*, the control unit 103 performs or realizes information processing functions and workings described later.

The acquisition unit 103*a* acquires a collection condition delivered from the data collection apparatus 10 and stores it as part of the collection condition information 102*a*. The detection unit 103*b* monitors output data of the various sensors 150 and detects occurrence of an event that is defined as a trigger in a collection condition.

For example, when detecting occurrence of an event that is defined as a trigger for pickup of vehicle data in a collection condition, the detection unit 103*b* causes the pickup unit 103*c* to pick up vehicle data. For another example, when detecting occurrence of an event that is defined as a trigger for uploading of vehicle data to the data collection apparatus 10 in a collection condition, the detection unit 103*b* causes the upload unit 103*d* to upload vehicle data.

When a trigger for pickup of vehicle data is detected by the detection unit 103*b*, the pickup unit 103*c* picks up vehicle data from output data of the various sensor 150 and stores them as part of the vehicle data information 102*b*. When a trigger for a stop of pickup of vehicle data is detected by the detection unit 103*b*, the pickup unit 103*c* stops pickup of vehicle data.

When a trigger for uploading of vehicle data is detected by the detection unit 103*b*, the upload unit 103*d* uploads vehicle data of the vehicle data information 102*b* to the data collection apparatus 10.

Figure 3A:
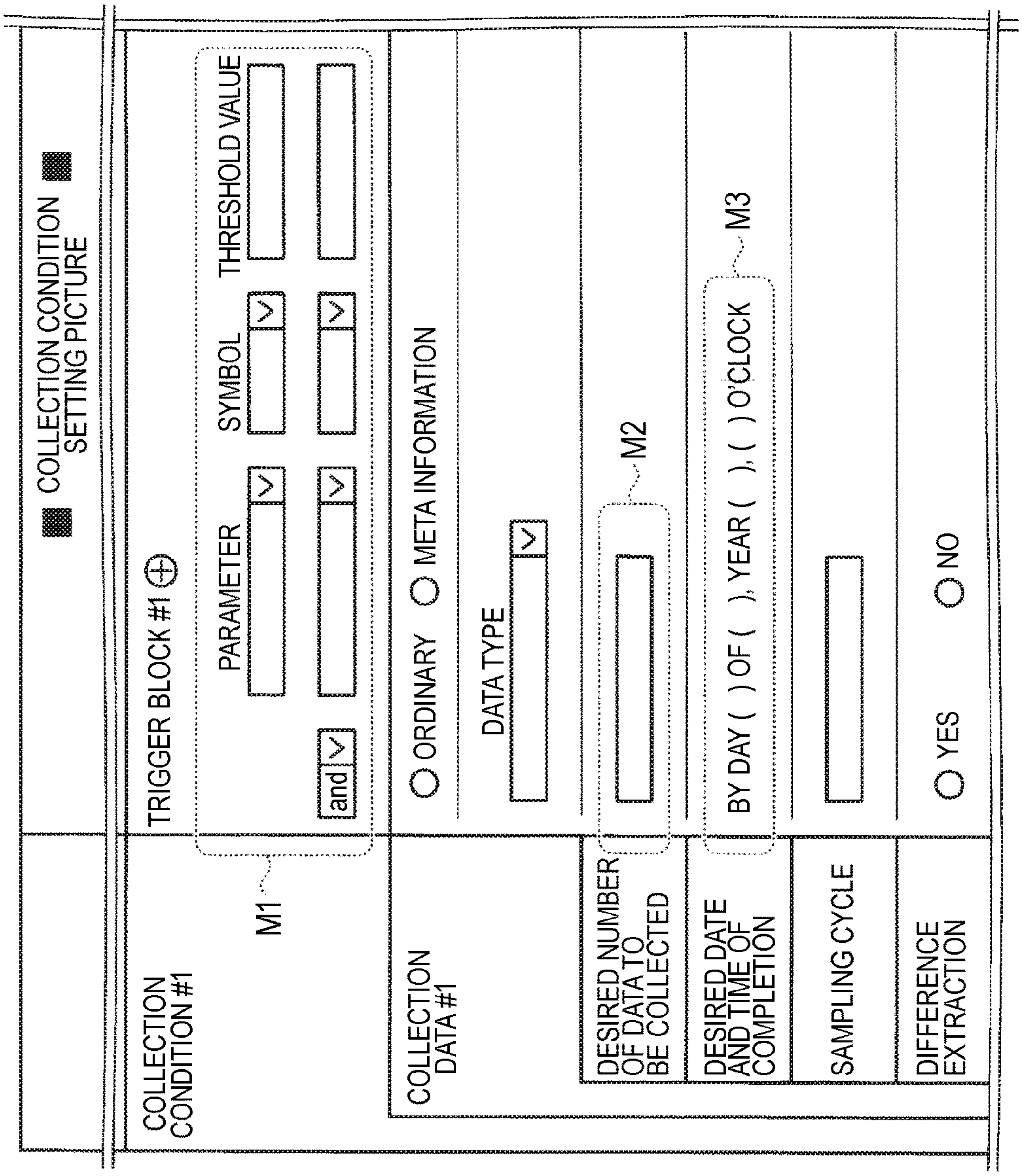
FIG. 3A is a first drawing showing an example collection condition setting picture.
Figure 3B:
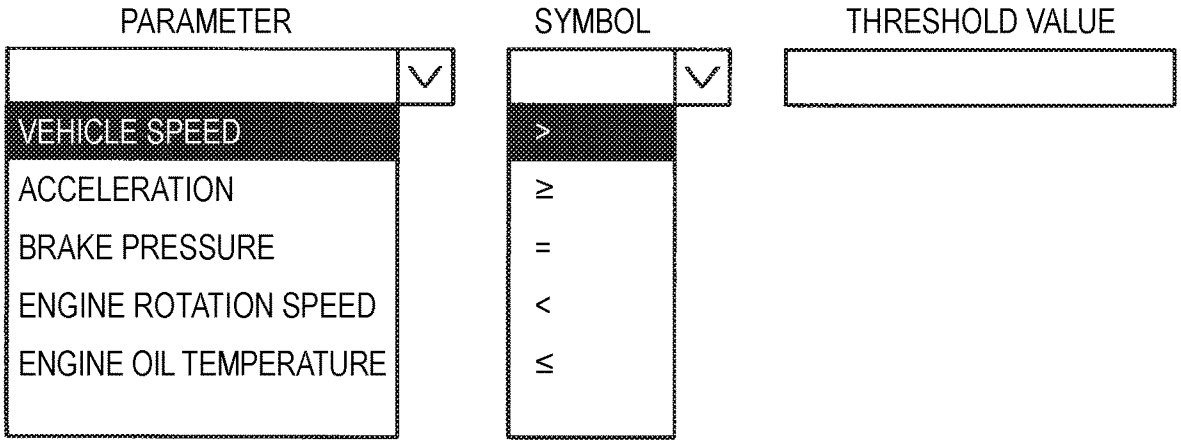
FIG. 3B is a second drawing showing the example collection condition setting picture.

Next, a specific example collection condition setting picture that is provided as a UI picture to the user terminal 200 by the UI providing unit 13*a* will be described will be described with reference to FIGS. 3A and 3B. FIGS. 3A and 3B are first and second drawings showing an example collection condition setting picture.

As shown in part M1 of FIG. 3A, the collection condition setting picture has, for each collection condition, an item "trigger block" through which a condition formula for generation of an event as a trigger of pickup of vehicle data.

In this item, as shown in FIG. 3B, "parameter" and "symbol" of a condition formula can be selected using a dropdown list of a GUI widget. Whereas "threshold value" can be specified by, for example, direct input, a dropdown list may be employed to enable specifying of it as in the case of "parameter" and "symbol."

As shown in FIG. 3A, such a trigger block item can be added by pushing a "+" button. When such a trigger block item is added, a portion for input of a Boolean operator such as "and" or "or" is displayed to enable setting of a logic condition (see part M1 in FIG. 3A). This enables specifying of generation of a trigger event using a composite condition.

As shown in FIG. 3A, in the collection condition setting picture, it is possible to specify a more detailed condition for collection of data. For example, "ordinary" and "meta information" between which selection can be made using, for example, a radio button of a GUI widget correspond to real data R and data T (described above), respectively. "Data type" is an item for specifying of a type of vehicle data to be picked up such as an accelerator position.

An item "desired number of data to be collected" is an item for specifying of a desired number of data to be collected (mentioned above). When the data user specifies, for example, a desired number in part M2 shown in FIG. 3A, the data collection apparatus 10 generates guidance information on the basis of the specified number.

An item "desired date and time of completion" is an item corresponding to a collection period to be specified by the data user. A collection period desired by the data user is set when the data user inputs a desired date and time of completion into part M3 shown in FIG. 3A.

An item "sampling period" is an item for specifying of a sampling period. An item "extraction of difference" makes it possible to specify whether to pick up only data having a difference bit length with respect to previous data. In this manner, the data user can specify a collection condition in a flexible manner according to a purpose.

Figure 4C:
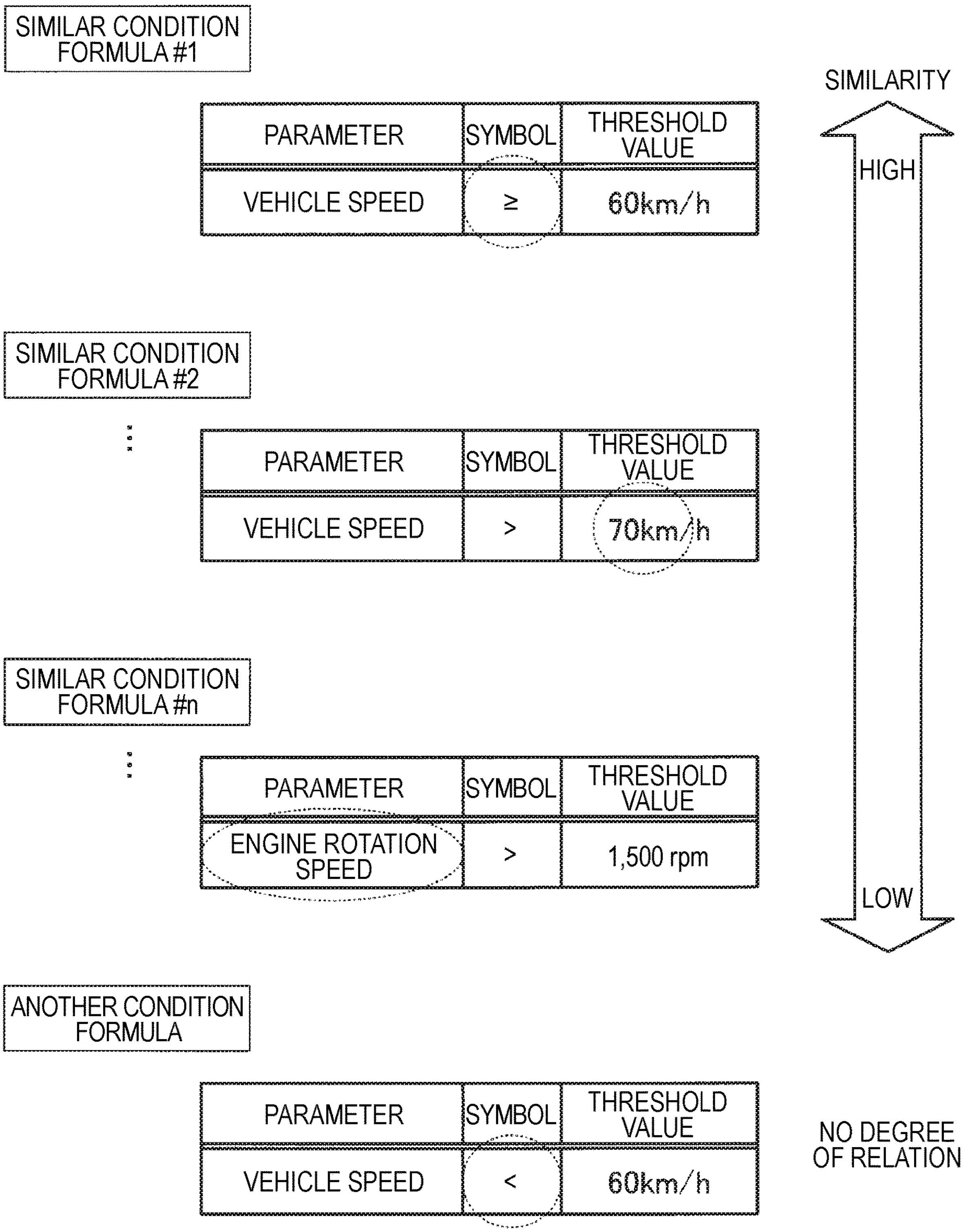
FIG. 4C is a third drawing for description of the similar condition search operation.

Next, a feature that the analysis unit 13*c* searches the collection condition information DB 12*a* for past similar conditions in descending order of similarity will be described with reference to FIGS. 4A-4C. FIGS. 4A-4C are first to third drawings for description of a similar condition search operation.

As a premise of the description, it is assumed that a condition formula shown in FIG. 4A has been specified in a trigger block described above.

The analysis unit 13*c* gives weights (degrees of relation) to respective items that are specified for each of "parameter," "symbol," and "threshold value" of the trigger block. In the following description, where degrees of relation or priority ranks are denoted by alphabetical characters such as "A" to "F," it is assumed that the degree of relation or the priority rank is higher on the "A" side. Where degrees of relation are denoted by symbols "Δ" and "x," it is assumed that the degree of relation of "Δ" is higher than that of "x."

More specifically, where the condition formula shown in FIG. 4A is specified, as shown in FIG. 4B the analysis unit 13*c* sets degrees of relation "A," "B," "C," and "F" for specified parameters (specified values) "vehicle speed," "acceleration," "engine rotation speed," "brake pressure," and "engine oil temperature," respectively.

With respect to the specified symbol (specified value) ">," the analysis unit 13*c* sets a degree of relation "Δ" for a specified symbol "≥" and sets a degree of relation "x" for specified symbols "=," "<," and "≤."

Furthermore, with respect to the specified threshold value "60," the analysis unit 13*c* sets a degree of relation "Δ" for specified values "50" and "70" that are close to it and sets a degree of relation "x" for specified values "40" and "80."

In addition to the above settings, the analysis unit 13*c* sets priority ranks for the items "parameter," "symbol," and "threshold value." It is assumed here that, for example, priority ranks "C," "A," and "B" are set for the items "parameter," "symbol," and "threshold value," respectively.

Then the analysis unit 13*c* generates similar condition formulae indicating respective similar conditions in descending order of similarity while varying the specified value in descending order of the priority rank and the degree of relation. Then the analysis unit 13*c* searches the collection condition information DB 12*a* for past similar conditions in descending order of similarity.

For example, according to the priority ranks and the degree of relation shown in FIG. 4B, the analysis unit 13*c* generates, as similar condition formula #1, a condition formula by changing the symbol from ">" to "≥." The analysis unit 13*c* searches the collection condition information DB 12*a* for past similar conditions that satisfy the similar condition formula #1.

If no similar condition is found, for example, the analysis unit 13*c* generates, as similar condition formula #2, a condition formula by changing the threshold value from "60 km/h" to "70 km/h." The analysis unit 13*c* searches the collection condition information DB 12*a* for past similar conditions that satisfy the similar condition formula #2.

If no similar condition is found even if the above operation is performed certain times, the analysis unit 13*c* generates, as similar condition formula # n, a condition formula by changing the parameter from "vehicle speed" to "engine rotation speed" and changing the threshold value accordingly. The analysis unit 13*c* searches the collection condition information DB 12*a* for past similar conditions that satisfy the similar condition formula # n.

If no similar condition is found even if the above operation is performed repeatedly and only a condition formula without a degree of relation remains, the analysis unit 13*c* judges that there is no similar condition.

For example, the degree of relation shown in FIG. 4B may be reflected in the above-described dropdown list (see FIG. 3B) in guiding the data user in changing the collection condition. For example, in urging the data user to change the current specified value, specified value candidates may be listed in such a dropdown list in descending order of the degree of relation.

In other words, the UI providing unit 13*a* provides guidance so as to recommend specified values of an item other than one item of a collection condition according to a specified value specified for the one item. This makes it possible to allow the data user to set another parameter easily according to the content of a parameter specified by the data user.

Figure 5:
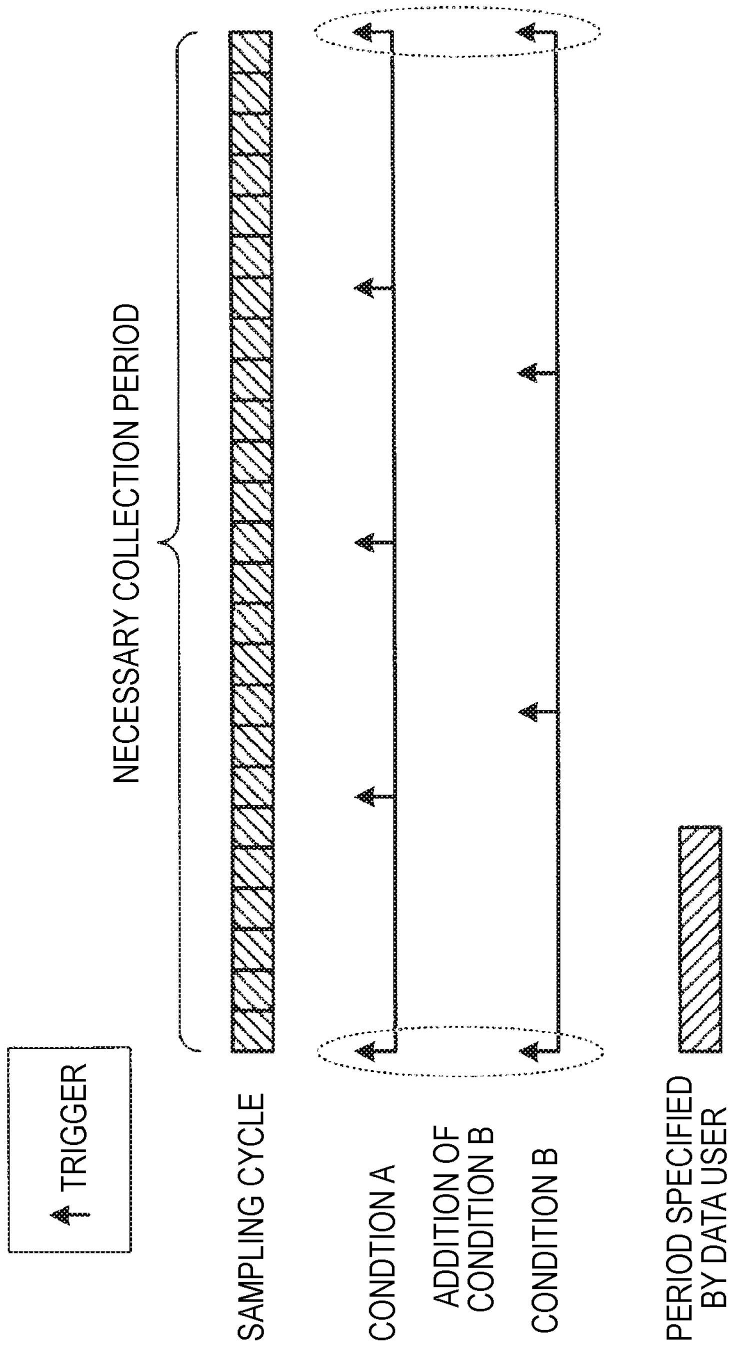
FIG. 5 is a chart for description of a method for calculating a probability of occurrence of a collection condition.

Next, a method for calculating a probability of occurrence of a collection condition by the analysis unit 13*c* will be described with reference to FIG. 5. FIG. 5 is a chart for description of a method for calculating a probability of occurrence of a collection condition. As shown in FIG. 5, first, the analysis unit 13*c* sets a necessary collection period in a case that a desired number of data are collected at a specified sampling cycle.

The analysis unit 13*c* extracts, for each condition formula (for each of "condition A" and "condition B"), a frequency of occurrence of triggers under a similar condition that is similar to the specified collection condition and maps the triggers onto the necessary collection period.

Then the analysis unit 13*c* calculates a probability of occurrence of an event to become a trigger for each condition formula on the basis of a mapping result. The analysis unit 13*c* calculates a probability that the AND condition of the combination of the condition formulae (portions enclosed of dotted-line closed curves in FIG. 5) becomes true. Furthermore, the analysis unit 13*c* calculates a probability that the AND condition becoming true is repeated X times. If there are plural combinations of condition formulae, the analysis unit 13*c* calculates a probability that the AND condition each combination becomes true and a probability of occurrence of repetition.

The analysis unit 13*c* calculates an expected sampling number, that is, the number of data to be collected as an expected number. Such a calculation result of the analysis unit 13*c* is communicated to the guidance generation unit 13*d*, and the guidance generation unit 13*d* generates guidance information including probability information as shown in FIG. 1G and other information on the basis of the received calculation result.

The product of probabilities (% values) of satisfaction of individual condition formulae is equal to a probability that the combination becomes true. However, in many cases, there exists a correlation and hence an actual probability is higher than the product. Thus, a simplified method may be employed in which a table showing correlation coefficients between threshold values (having proper intervals) of the parameter of each condition formula is set in advance and a probability is calculated taking into consideration a correlation coefficient corresponding to the product using the table.

Figure 6:
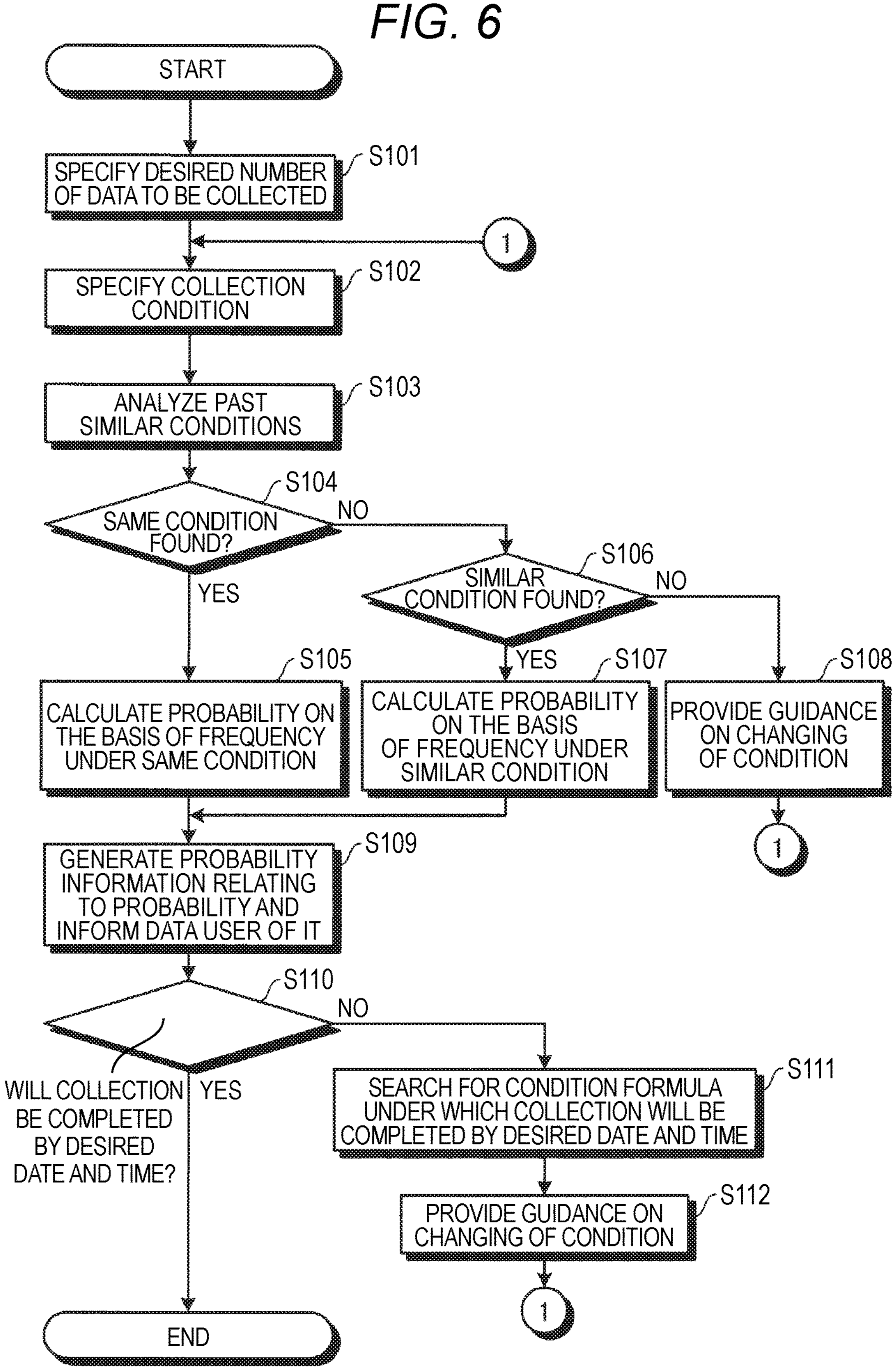
FIG. 6 is a flowchart of a process that is executed by the data collection system according to the embodiment.

Next, a process that is executed by the data collection system 1 according to the embodiment will be described with reference to FIG. 6. FIG. 6 is a flowchart of the process that is executed by the data collection system 1 according to the embodiment.

First, at step S101, the data user specifies a desired number of data to be collected through the user terminal 200. At step S102, the data user specifies a collection condition through the user terminal 200.

At step S103, the analysis unit 13*c* of the data collection apparatus 10 analyses past similar conditions. If the same condition is found (S104: yes), at step S105 the analysis unit 13*c* calculates a probability of occurrence under the specified condition on the basis of a frequency of occurrence of triggers under the same condition.

If the same condition is not found (S104: no), the analysis unit 13*c* searches for similar conditions (not the same condition) in descending order of similarity. If a similar condition is found (step S106: yes), at step S107 the analysis unit 13*c* calculates a probability of occurrence under the specified condition on the basis of a frequency of occurrence of triggers under the similar condition.

If no similar condition comes to be found after searching for similar conditions in descending order of similarity (S106: no), at step S108 the guidance generation unit 13*d* generates guidance information and the UI providing unit 13*a* provides guidance on changing of the condition on the basis of the generated guidance information. Then the process returns to step S102.

On the other hand, if a probability of occurrence is calculated at step S105 or S107, at step S109 the guidance generation unit 13*d* generates probability information relating to the probability and the UI providing unit 13*a* informs the data user of it.

If the collection will be completed by the desired date and time (S110: yes), the process is finished. On the other hand, if the collection will not be completed by the desired date and time (S110: no), at step S111 the analysis unit 13*c* searches for a condition formula under which the collection will be completed by the desired date and time.

At step S112, the guidance generation unit 13*d* generates guidance information on the basis of a result of the search and the UI providing unit 13*a* provides guidance on changing of the condition on the basis of the generated guidance information. Then the process returns to step S102.

As described above, the data collection apparatus 10 according to the embodiment is equipped with the collection unit 13*f*, the reception unit 13*b*, the analysis unit 13*c*, and the UI providing unit 13*a* (an example of the "providing unit"). The collection unit 13*f* collects data relating to respective vehicles V from vehicular devices 100 installed in the respective vehicles V. The reception unit 13*b* receives a data collection condition specified by a data user (an example of the "user"). The analysis unit 13*c* calculates a probability of occurrence of an event for collection of data specified in the collection condition on the basis of past data collection results. The UI providing unit 13*a* provides the user with information that is based on the probability of occurrence calculated by the analysis unit 13*c*.

Configured as described above, the data collection apparatus 10 according to the embodiment allows the data user to recognize the certainty of information collection under a specified collection condition.

The reception unit 13*b* receives, together with the collection condition, a desired number of data to be collected specified by the user. The analysis unit 13*c* derives a data collection period required for collection of the desired number of data on the basis of the probability of occurrence and causes the UI providing unit 13*a* to provide information relating to the collection period.

With these features, the data collection apparatus 10 according to the embodiment allows the data user to recognize information relating to a data collection period required for collection of a desired number of data.

The UI providing unit 13*a* provides the data user with at least information relating to a scheduled date and time of completion of collection of the desired number of data or information relating to the number of data to be collected by a date and time specified by the user.

With this feature, the data collection apparatus 10 according to the embodiment allows the data user to recognize a scheduled date and time of completion of collection of a desired number of data or the number of data to be collected by a date and time specified by the data user.

The analysis unit 13*c* extracts, from the collection results, a similar condition that is a past collection condition similar to the collection condition received by the reception unit 13*b*, derives a frequency of occurrence of the event under the similar condition, and calculates a probability of occurrence on the basis of the frequency of occurrence.

With this feature, the data collection apparatus 10 according to the embodiment can inform the data user with a probability of occurrence that is calculated with high accuracy on the basis of past collection results.

The analysis unit 13*c* extracts a similar condition according to priority ranks that are set for respective items of the collection condition and degrees of relation of values specified for respective items specified by the data user.

With this feature, the data collection apparatus 10 according to the embodiment can extracts a similar condition that is substantially equivalent to the collection condition specified by the data user because it extracts a similar condition according to priority ranks and degrees of relation rather than a mere degree of coincidence with the collection condition.

In the above-described embodiment, if a similar condition that is similar to a specified collection condition is found, the analysis unit 13*c* extracts a frequency of occurrence of triggers under the similar condition and calculates a probability of occurrence under a specified collection condition on the basis of the extracted frequency. However, the invention is not limited to this.

For example, the analysis unit 13*c* may generate a learning model of performing machine learning such as deep learning on the basis of past results in a prescribed period existing in the collection condition information DB 12*a* and the collection data DB 12*b* and, when a desired collection condition is input, outputting a probability of occurrence of triggers and a predicted date and time of completion corresponding to the collection condition.

Furthermore, although in the above-described embodiment the data user is, for example, a developer of an autonomous drive technique, this is just an example; the data user may be a corporation such as a service provider or a general individual.

Those skilled in the art would easily conceive other advantages and modifications. Thus, broader modes of the invention are not limited to the above-described particular, detailed, and typical embodiment. Various modifications are therefore possible without departing from the spirit and scope of a generalized inventive concept that is defined by the claims and their equivalents.

DESCRIPTION OF SYMBOLS

1: Data collection system
10: Data collection apparatus
12*a*: Collection condition information DB
12*b*: Collection data DB
13*a*: UI providing unit
13*b*: Reception unit
13*c*: Analysis unit
13*d*: Guidance generation unit
13*e*: Distribution unit
13*f*: Collection unit
100: Vehicular device
102*a*: Collection condition information
102*b*: Vehicle data information
103*a*: Acquisition unit
103*b*: Detection unit
103*c*: Pickup unit
103*d*: Upload unit
150: Various sensors
200: User terminal
V: Vehicle

What is claimed is:

1. A data collection apparatus comprising:
a hardware processor; and
a memory coupled to the hardware processor,
wherein the hardware processor is configured to function as:
a collection unit which collects data relating to respective vehicles from vehicular devices installed in the respective vehicles;
a reception unit which receives a data collection condition specified by a user;
an analysis unit which calculates a probability of occurrence of an event for collection of data specified in the collection condition based on past data collection results; and
a providing unit which provides the user with information that is based on the probability of occurrence calculated by the analysis unit,
wherein the reception unit receives, together with the collection condition, a desired number of data to be collected specified by the user, and
wherein the analysis unit derives a data collection period required for the desired number of data to be collected based on the probability of occurrence and causes the providing unit to provide information relating to the collection period.

2. The data collection apparatus according to claim 1, wherein the providing unit provides the user with at least information relating to a scheduled date and time of completion of collection of the desired number of data or information relating to the number of data to be collected by a date and time specified by the user.

3. The data collection apparatus according to claim 1, wherein the analysis unit extracts, from the collection results, a similar condition that is a past collection condition similar to the collection condition received by the reception unit, derives a frequency of occurrence of the event under the similar condition, and calculates a probability of occurrence based on the frequency of occurrence.

4. The data collection apparatus according to claim 2, wherein the analysis unit extracts, from the collection results, a similar condition that is a past collection condition similar to the collection condition received by the reception unit, derives a frequency of occurrence of the event under the similar condition, and calculates a probability of occurrence based on the frequency of occurrence.

5. The data collection apparatus according to claim 3, wherein the analysis unit extracts a similar condition according to priority ranks that are set for respective items of the collection condition and degrees of relation of values specified for respective items specified by the user.

6. The data collection apparatus according to claim 4, wherein the analysis unit extracts a similar condition according to priority ranks that are set for respective items of the collection condition and degrees of relation of values specified for respective items specified by the user.

7. A data collection system comprising:
the data collection apparatus according to claim 1;
the vehicular devices; and
a terminal device through which the user performs manipulations for specifying a data collection condition and receives the information that is based on the probability of occurrence calculated by the analysis unit.

8. A data collection method comprising:

collecting data relating to respective vehicles from vehicular devices installed in the respective vehicles;

receiving a data collection condition specified by a user;

calculating a probability of occurrence of an event for collection of data specified in the collection condition based on past data collection results; and providing the user with information that is based on the calculated probability of occurrence, wherein the receiving includes receiving, together with the collection condition, a desired number of data to be collected specified by the user, and wherein the method further includes deriving a data collection period required for the desired number of data to be collected based on the probability of occurrence and causing the providing to provide information relating to the collection period.

* * * * *